Sept. 20, 1960 D. BUCCICONE 2,953,238
SHEET HANDLING APPARATUS
Filed June 4, 1958 2 Sheets-Sheet 1
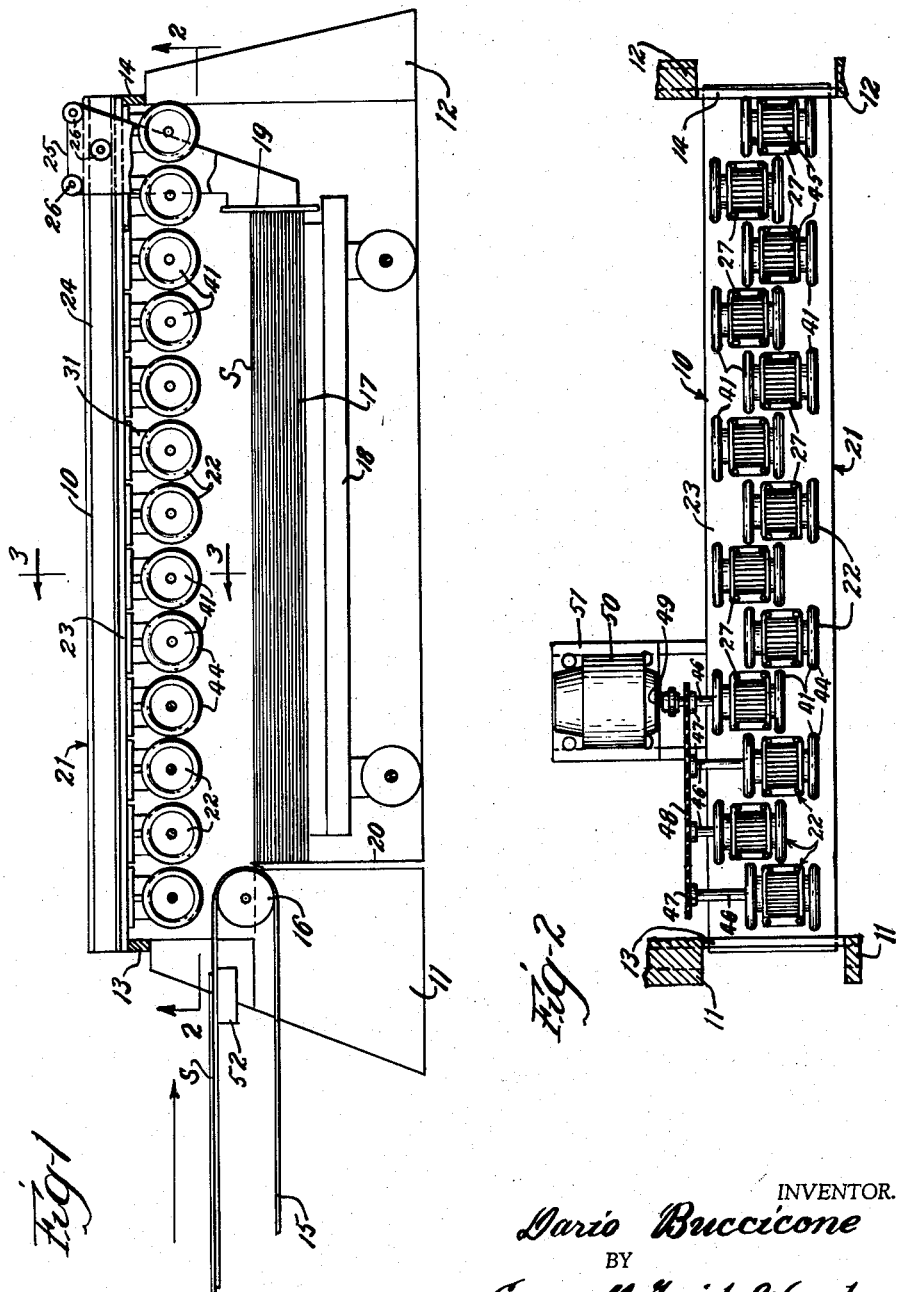
INVENTOR.
Dario Buccicone
BY
Cromwell, Greist + Warden
Attys.

Sept. 20, 1960   D. BUCCICONE   2,953,238
SHEET HANDLING APPARATUS
Filed June 4, 1958   2 Sheets-Sheet 2
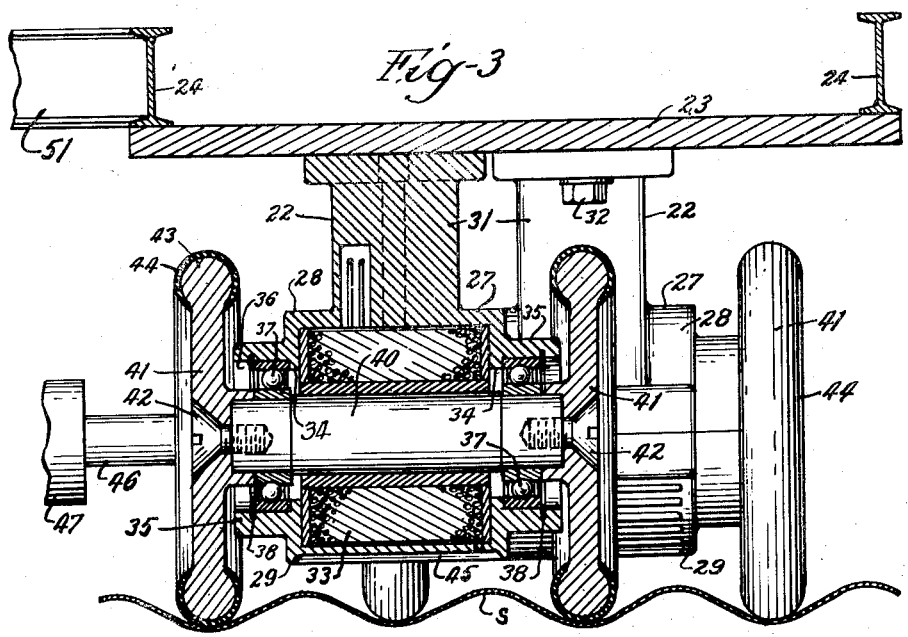
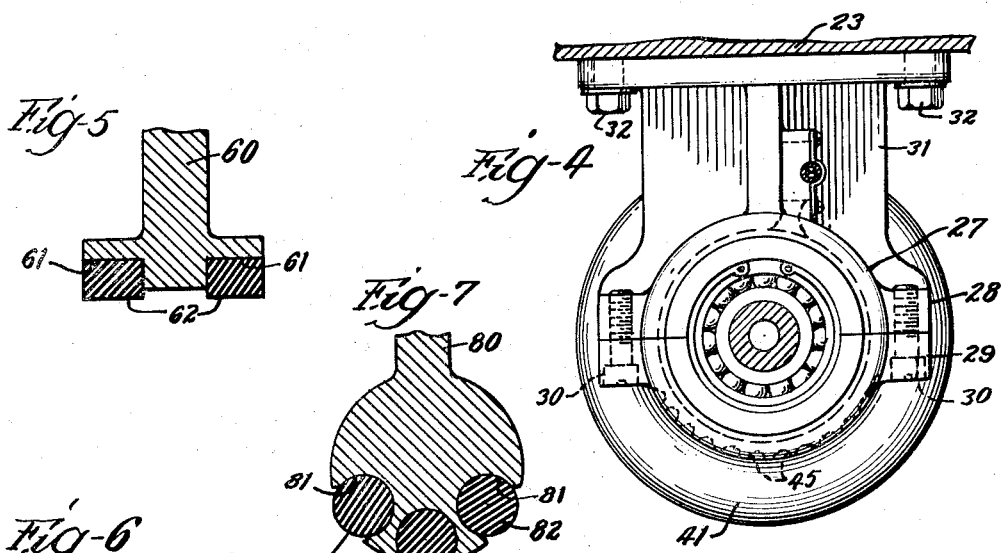
INVENTOR.
Dario Buccicone
BY
Cromwell, Greist & Warden
Attys.

United States Patent Office 2,953,238
Patented Sept. 20, 1960

2,953,238
SHEET HANDLING APPARATUS

Dario Buccicone, Gary, Ind., assignor to Bucciconi Engineering Co., Inc., Gary, Ind., a corporation of Indiana Filed June 4, 1958, Ser. No. 739,841

4 Claims. (Cl. 198—41)

This invention relates to apparatus for handling metal sheets and is more particularly concerned with improvements in an electromagnetic conveyor for moving successive sheets into position for deposit on a pile.

Apparatus has heretofore been provided for handling metal sheets of varying width and length in which the sheets are held by electromagnetic force against the bottom run of traveling belts supported on pulleys at opposite ends of the conveyor. Such a conveying apparatus, when designed to handle sheets of substantial length, is made with a slight bow on the bottom, for example, as shown in my Patent No. 2,642,174, dated June 16, 1953. The slight bow which is incorporated in the belt type conveyor to accommodate the sag in the belts makes it difficult to handle certain types of sheets such as corrugated sheets which do not readily bend when corrugated lengthwise and thus will not conform to the curvature of the conveyor. Also, the size of such conveyors is limited because of the extent of the sag in extra long belt lengths. Consequently, it is desirable to provide a special type conveyor apparatus for handling metal products which do not readily bend about their transverse axis, such as for example corrugated metal sheeting, or when the sheets are extra long, and it is a general object, therefore, of the present invention to provide a conveying apparatus which may be of unlimited length and which is capable of handling with equal efficiency products presenting either a flat upper surface or a non-planar surface, such as corrugated sheets.

It is a further object of the invention to provide a conveyor of the type which employs electromagnets to hold the product being conveyed against the bottom surface and which is so constructed that the article being conveyed rides on laterally spaced rotating members, one or more of which may be driven to advance the product along the conveyor.

It is another object of the invention to provide an electromagnetic conveyor for products such as corrugated metal sheets wherein the conveyor comprises a series of electromagnetic units depending from an overhead support with the magnet cores rotatably mounted and carrying on opposite ends thereof extension pole pieces in the form of wheel or roller members which are adapted to engage with the uppermost surface of the product being conveyed.

These and other objects and advantages of the invention will be apparent from a consideration of the article handling and piling apparatus which is shown by way of illustration in the accompanying drawings wherein:

Figure 1 is an elevation, partially schematic, of a sheet piling apparatus employing an electromagnetic conveyor having incorporated therein the principal features of the invention;

Figure 2 is a bottom view of the conveyor shown in Figure 1, the view being taken on the line indicated at 2—2 on Figure 1;

Figure 3 is a cross section taken on the line 3—3 of Figure 1 to an enlarged scale;

Figure 4 is a side elevation of one of the electromagnetic assemblies; and

Figures 5, 6 and 7 are fragmentary sections illustrating several modifications of the pole end pieces.

In the piling of metal sheets with conventional equipment, an electromagnetic conveyor in the form of one or more overhead rail units may be used, with the sheets being held to the bottom surface of the conveyor belts by electromagnetic force and with associated pile forming mechanism arranged in the same relationship as illustrated in Figure 1 of the drawings. This general arrangement may be employed in using the conveyor of the present invention.

In the piling arrangement illustrated in Figure 1, an overhead conveyor 10 is supported on end frames 11 and 12 by cross rails 13 and 14. An endless belt feed conveyor 15 having its delivery end supported on the cross roller 16 is arranged at one end of the conveyor 10 to feed the sheets S to the entrance end of the latter. The successive sheets S are delivered to the bottom surface of the conveyor 10 and advanced to a position over the pile which is indicated at 17 on the buggy 18 and then deposited by dropping them onto the pile. An end stop, indicated at 19, a back stop, indicated at 20, and suitable side guides (not shown) are provided for stopping the advancing sheets and for guiding the trailing end onto the pile 17.

The conveyor 10 may comprise one or more rail units 21. Each rail unit 21 preferably comprises a series of electromagnetic assemblies 22 arranged in longitudinally spaced, staggered relation and depending from a top support member 23 (Figure 3) to which they are bolted or otherwise secured. The member 23 is attached in any conventional manner to the bottom flanges of a pair of I-beams 24, the latter being laterally spaced and forming a supporting track for the carriage 25 on which a frame carrying the end stop 19 is mounted. The carriage 25 is provided with rollers 26 for adjustably supporting the same on the I-beams 24.

Each magnet assembly 22 (Figures 3 and 4) comprises a housing 27 of non-magnetic material which is formed in two parts 28 and 29, the latter being secured together by bolts 30 or other fastening elements. The housing member 28 has a base in the form of a pedestal 31 which is bolted at 32 or otherwise secured to the bottom face of support plate 23 so that the unit depends beneath the plate 23. The housing 27 encloses an electromagnetic coil 33 in the form of a ring which is positioned with its axis extending transversely of the conveyor and with the open ends of its core receiving center aligned with oppositely disposed openings 34 provided in the side faces of the housing at the inner ends of hub-like formations 35 which have internal bearing receiving recesses 36 in which ball bearings 37 are seated and retained by snap rings 38. A cylindrical core or pole piece 40 for the magnet unit has its ends supported by the ball bearings 37 and an end member in the form of a disc-like wheel or roller 41 is secured by the bolt 42 to each end of the core or pole piece 40 for rotation with the same. The flux carrying roller or wheel 41 has a peripheral portion 43 which is circular in cross section and which may be covered with a rubber coating or tire indicated at 44 so as to protect the sheets or other articles with which it comes in contact against scratching or other surface damage.

The coil housings 27 may be provided with suitable air cooling fins indicated at 45 on the exterior surface.

The magnetic assemblies or units 22 are arranged on the support plate 23 as shown in Figures 2 and 3 in longitudinally spaced staggered relation with alternate units 22 in longitudinal alignment so that the rotating end pole pieces are aligned for engaging in the hollows of a longitudinally corrugated metal sheet S. This arrangement may be varied depending upon the surface configuration of the sheet being handled.

In the arrangement shown in Figures 1 and 2, the first four magnet units or assemblies 22 are arranged with extension shafts 46 provided on the one end of the pole pieces 40 on which end sprockets 47 are mounted and which are driven by the chain 48 from the output shaft 49 of a drive motor 50 suspended from a laterally extending frame 51 attached to one of the rails 24, one of the magnet units 22 having its extension shaft 46 connected directly to the drive shaft 49. By driving the pole pieces 40 of the units 22 which are at the entrance end of the conveyor the successive sheets S may be advanced along the conveyor without the use of pinch rolls or any other feeding means at the sheet receiving end of the conveyor and with the use of minimum power for advancing the sheets.

The energizing and de-energizing of the magnet coils 33 is controlled by an inductor switch 52 at the discharge end of the feed conveyor 15. The switch 52 is actuated by the passage of the sheet S so as to control the energizing or de-energizing of the coils 33 in the required sequence for dropping the sheet S on the pile 17 when it has reached the proper position above the buggy 18. A suitable switch for this purpose is described in my Patent No. 2,751,150, dated June 19, 1956.

The end members 41 on the rotating pole pieces 40 have a peripheral portion 43 which is circular in cross section so as to adapt the conveyor to the handling of corrugated sheets as illustrated in Figure 3. However, the end portions of the rotatable poles may be varied to suit the surface characteristics of the material which is to be handled by the conveyor. The periphery of the wheel may take other forms as shown in Figures 5 to 7.

In Figure 5, the periphery of the pole end member or wheel 60 is cylindrical and provided with rabbeted or recessed edges at 61 to receive spaced rubber tires or bands 62. This form of the wheel 60 is adapted for handling flat surfaced articles.

In Figure 6 the pole end member or wheel 70 is provided with a cylindrical periphery which is recessed to provide a plurality of spaced grooves 71 for receiving rubber bands or tires 72 of cylindrical cross section.

In Figure 7 the peripheral portion of the pole end member or wheel 80 is circular in cross section and is provided with a series of spaced recesses 81 of circular cross section for receiving a plurality of bands or tires 82 also of circular cross section. In this and in all of the modified forms the tire members are arranged so that their exterior surfaces extend slightly beyond the surface of the wheel.

While particular materials and specific details of construction have been referred to in describing the illustrated forms of the invention, it will be understood that other materials and variations in the details of the apparatus may be resorted to.

I claim:

1. A conveyor apparatus for handling corrugated metal sheets which comprises an elongate supporting frame and a series of electromagnetic units arranged along the length of said frame, each of said electromagnetic units comprising a depending support member having a housing formed in the lower end thereof, a pole piece extending transversely of the conveyor and having its opposite ends journaled in oppositely disposed bearings in the side walls of the housing, an electromagnetic coil secured in said housing with the pole piece extending through the same, wheel members secured in parallel relation to opposite ends of said pole piece and forming extensions thereon, said wheel members of each electromagnetic unit having a peripheral surface which is relatively narrow and which travels in a circular path, the lowermost portion of which path is a substantial distance below said housing, said wheel members of each electromagnetic unit being spaced transversely of the conveyor in accordance with the spacing of the sheet corrugations and the wheel members of each of said electromagnetic units being arranged to travel in paths which are spaced transversely relative to the wheel members of adjacent units so as to engage the sheets between the corrugations thereof.

2. In an apparatus for handling corrugated metal sheets, an elongate conveyor and means for delivering the sheets thereto, said conveyor comprising a supporting frame, and a series of electromagnetic units arranged in longitudinally spaced relation thereon, each of said electromagnetic units comprising an electromagnetic coil fixed on said supporting frame member, a pole piece extending transversely of the conveyor and through said coil, said pole piece being rotatably supported in oppositely disposed, laterally spaced bearing formations, and pole end extensions in the form of wheel members attached to opposite ends of the pole piece and rotatable therewith, said wheel members rotating in parallel paths which are spaced transversely of the conveyor in accordance with the transverse spacing of the corrugations in the sheets and said wheel members having relatively narrow peripheral rim portions traveling in paths extending a substantial distance from the coil in the direction of the sheet engaging face of the conveyor and adapted to engage the sheet in the valleys formed by the corrugations, with space being provided between the wheel members to accommodate the intervening high portions of the corrugations.

3. In a magnetic sheet handling apparatus which is characterized by an elongate overhead conveyor rail unit having means for advancing successive metal sheets delivered thereto, a series of electromagnetic units arranged in longitudinal and alternate lateral spaced depending relation, each of said units comprising a coil support, a magnet coil, a pole piece rotatably supported in oppositely disposed laterally spaced bearing formations and extending through said coil, and axially spaced pole extension members carried on said pole piece for rotation therewith, said pole extension members being arranged to rotate in parallel vertical planes with pheripheral portions traversing a path extending a sufficient distance from the coil support for engagement with the uppermost surface of a sheet to be conveyed.

4. A magnetic article handling apparatus comprising an elongate overhead conveyor for advancing successive metal articles delivered to one end thereof, said conveyor having a series of electromagnetic units spaced lengthwise thereof and supported thereon in depending relation, each of said electromagnetic units having a housing extending transversely of said conveyor, an electromagnetic coil in said housing, a pole piece rotatably journaled in oppositely disposed sides of said housing and extending through said coil, wheel members secured on said pole piece, said wheel members being arranged to rotate in parallel planes with peripheral portions thereof extending beyond the housing for engagement with the surface of an article to be conveyed, and said electromagnetic units being arranged in alternate staggered relation crosswise of said conveyor.

References Cited in the file of this patent

UNITED STATES PATENTS

| 2,008,200 | Clauss | July 16, 1935 |
| 2,104,062 | Temple | Jan. 4, 1938 |
| 2,373,149 | Strickler | Apr. 10, 1945 |
| 2,588,085 | Clouse | Mar. 4, 1952 |